United States Patent [19]

Heitman et al.

[11] Patent Number: 4,527,440
[45] Date of Patent: Jul. 9, 1985

[54] SELF-ALIGNING CONTROL MECHANISM

[75] Inventors: Christopher J. Heitman; Gregory D. Schwehr, both of Milwaukee, Wis.

[73] Assignee: General Electric Company, Milwaukee, Wis.

[21] Appl. No.: 560,310

[22] Filed: Dec. 12, 1983

[51] Int. Cl.³ .................. E16H 35/18; G05G 1/10
[52] U.S. Cl. .................. 74/10 R; 74/553; 192/67 R; 200/153 P; 200/331; 200/43.08; 338/197
[58] Field of Search .......... 338/199, 184, 315, 197, 338/67; 361/417, 419; 200/331, 336, 153 P, 11 G; 74/506, 553, 10.27, 10.7, 42 R, 10 R; 192/67 R

[56] References Cited

U.S. PATENT DOCUMENTS

| | | | |
|---|---|---|---|
| 2,828,635 | 4/1958 | Johnson et al. | 74/10.7 X |
| 2,879,673 | 3/1959 | Passman | 74/10 X |
| 3,260,805 | 7/1966 | Pihl | 200/11 G |
| 3,369,409 | 2/1968 | Cinkutus | 74/10 |
| 3,657,496 | 4/1972 | Davidson | 200/43 |

FOREIGN PATENT DOCUMENTS 2312819 12/1976 France .................. 74/10

Primary Examiner—Roy N. Envall, Jr.
Assistant Examiner—C. N. Sears
Attorney, Agent, or Firm—Alexander M. Gerasimow; Douglas E. Stoner

[57] ABSTRACT

A self-aligning mechanism utilizes a flexible shaft affixed at one end to a means for rotating it. The other end of the rod is configured to engage a complementarily-shaped opening in a coupler provided with a funnel-shaped front surface to guide the flexible shaft into engagement. In one embodiment, the coupler is mounted directly to the shaft of the device to be adjusted. In another embodiment, the coupler is a pulley which drives, by means of a drive belt, a device which is offset in position relative to the flexible shaft. Wire-retaining means are provided to enable the knob and shaft to be easily removed and reinstalled with a minimum of effort and adjustment, even in the presence of misalignment in the X-, Y-, and Z-axis directions.

11 Claims, 5 Drawing Figures

SELF-ALIGNING CONTROL MECHANISM

BACKGROUND OF THE INVENTION

This invention relates to control mechanisms. More specifically, this invention relates to self-aligning control mechanisms.

Electronic apparatus of various kinds, including medical diagnostic apparatus, utilize control actuating mechanisms for adjustment of brightness, contrast, volume and the like parameters. Not infrequently, the actuating mechanisms must satisfy specific and demanding design criteria. The mechanism must be capable of accommodating misalignments in the X-, Y- and Z-axis directions due to wide tolerance variations in the apparatus in which the mechanism is used. To facilitate apparatus assembly, the actuating mechanism must be easily aligned without tedious adjustment. Similarly, the mechanism must be easy to remove and reinstall, preferably with minimum use of tools, for ease of service access to the apparatus. The mechanism must also have good operating characteristics such as smoothness and freedom from backlash. The foregoing and other criteria must be achieved in spite of typically limited spaced available for the mechanism. It is, therefore, a principal object of the invention to provide a low-cost control mechanism fulfilling these and other requirements.

SUMMARY OF THE INVENTION

A self-aligning control mechanism for adjusting a control device by means of rotational motion includes a flexible shaft secured at one of its ends to a means for imparting rotational motion to the shaft. A coupler means has an opening formed therein for engaging the other end of the flexible shaft for rotational movement, even when the coupler opening and shaft are longitudinally misaligned. The coupler means is coupled to the control device for transmitting thereto the rotational motion of the flexible shaft. The coupler is also provided with a funnel-shaped front surface for receiving and guiding into the opening the other end of the shaft, even when the shaft and the opening are laterally misaligned.

BRIEF DESCRIPTION OF THE DRAWINGS

The features of the invention believed to be novel are set forth with particularity in the appended claims. The invention itself, however, both as to its organization and method of operation, together with further objects and advantages thereof, may best be understood by reference to the following description taken in conjunction with the accompanying drawings in which:

DETAILED DESCRIPTION OF THE INVENTION

Figure 1:
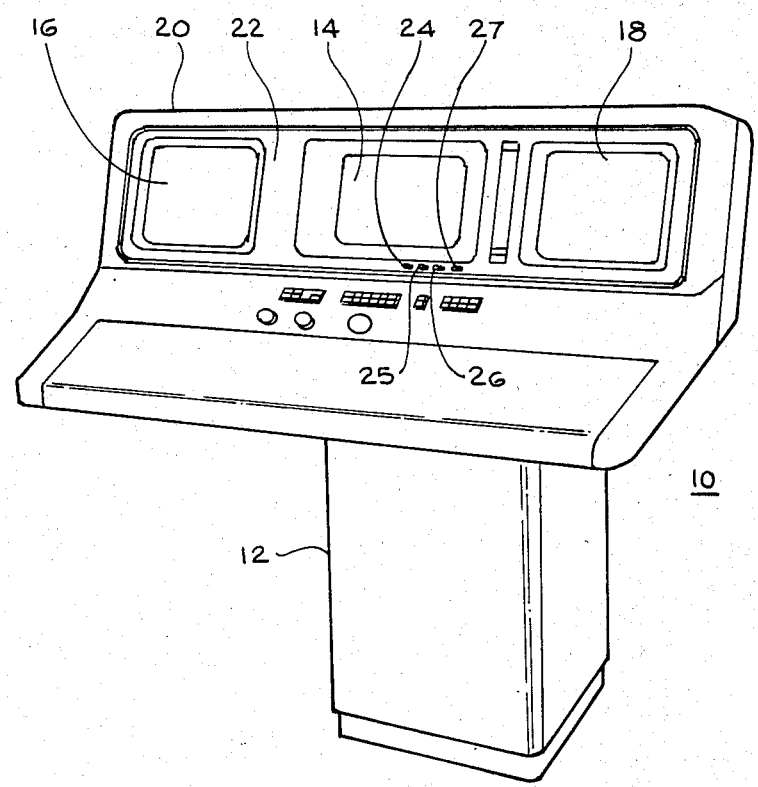
FIG. 1 depicts a perspective view of an operator console having a plurality of control actuating mechanisms in accordance with the invention.

FIG. 1 depicts an operator console designated 10 which may form part of a medical diagnostic apparatus, such as a nuclear magnetic resonance (NMR) apparatus. The console is supported by a pedestal base 12 and includes cathode ray tube (CRT) display monitor 14, and plasma displays 16 and 18 situated behind display housing 20 and bezel 22. There are also provided in housing 20 various controls 24–27 which may comprise contrast, brightness, and dual volume adjustment knobs, respectively. These knobs are utilized to actuate potentiometers and the like devices mounted to the CRT monitor chassis (not shown in FIG. 1). The monitor is serviceable from the front of the console. To gain access to the monitor chassis, the bezel and display housing portion lying behind and knobs 24–27 are designed to be removable.

The manner in which the knobs and the actuating mechanism associated therewith fulfill the requirements stated hereinbefore will now be described with reference to FIGS. 2, 3, and 4.

Figure 2:
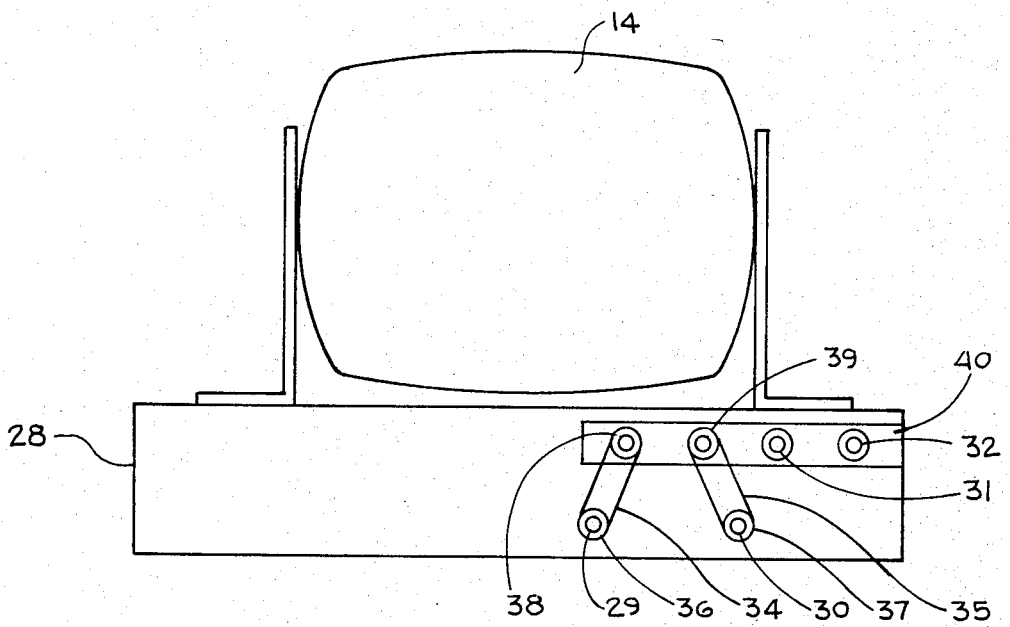
FIG. 2 is a front view of a monitor device forming part of the operator console shown in FIG. 1 and which partially depicts the inventive actuating mechanism.

Referring first to FIG. 2, there is shown CRT monitor 14 mounted on a monitor chassis 28. There are also shown control shafts 29–32 of contrast, brightness, and volume control potentiometers, respectively. Contrast and brightness potentiometers are offset relative to the position of knobs 24-25 in FIG. 1 and are driven by means of O-ring drive belts 34 and 35 which engage, respectively, lower pulleys 36 and 37, and upper pulleys 38 and 39, respectively, in a manner which will be disclosed hereinafter with reference to FIG. 3. The upper pulleys are journaled for rotation on a mounting block 40 which is attached to the monitor chassis. As will be disclosed hereinafter, the dual volume control potentiometers are also affixed to mounting block 40.

Figure 3:
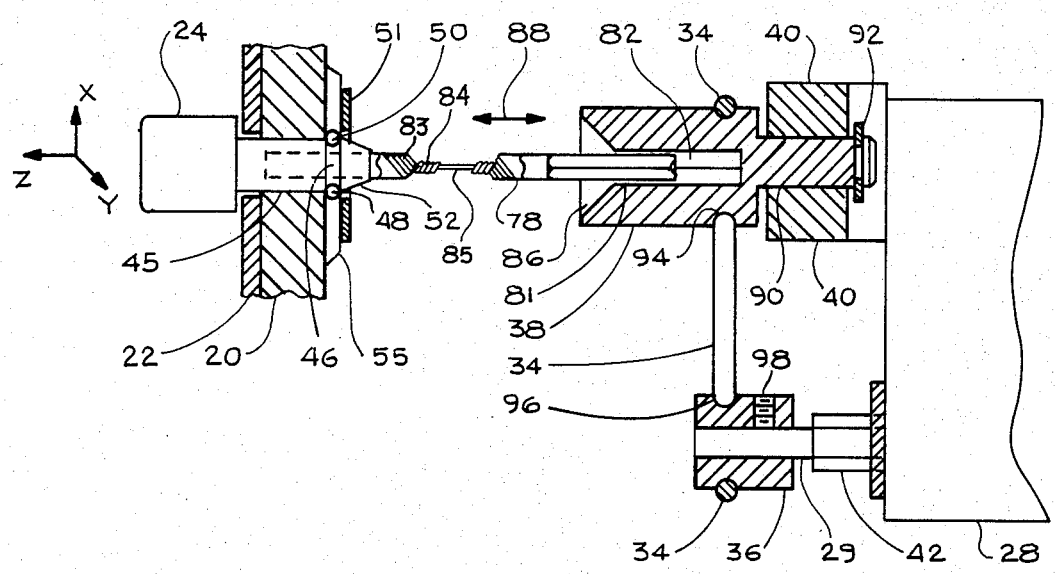
FIG. 3 is a side, cross-sectional view of one embodiment of a remotely-actuated, self-aligning control mechanism in accordance with the invention.

One embodiment of the invention utilized to remotely actuate the offset contrast and brightness controls is depicted in cross section in FIG. 3. This embodiment will be disclosed by way of example with reference to contrast control potentiometer 42 shown mounted to monitor chassis 28 and having lower pulley 36 secured to potentiometer actuator shaft 29 by means of a set screw 98. Potentiometer 42 is adjusted by means of control knob 24 having an integral shaft 45 which is journaled for rotation in display housing 20. Integral shaft 45 has a groove 46 which serves to retain the knob in place by action with two retainer wires 48 and 50 which are attached to a raised pad 55 in the display housing and held in place by retainer plate 51. The integral shaft also has a cone-shaped end 52 which allows the knob to be easily inserted by spreading the retainer wires apart until they snap into the groove.

Figure 4:
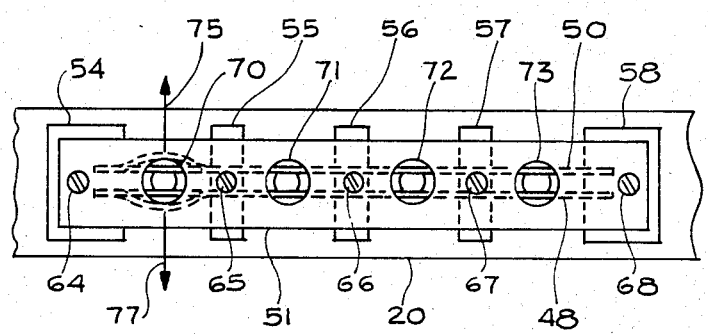
FIG. 4 depicts in greater detail of the means for retaining in position the control knobs in accordance with the invention.

FIG. 4 depicts in greater detail the knob-retainer mechanism. Referring now to FIG. 4, there is shown a back view of the retainer mechanism mounted to display housing 20. The mechanism includes a plurality of raised pads 54–58 in display housing 20 having slots formed therein for accommodating parallel retainer wires 48 and 50 of the type known as music wire. Retainer plate 51 is fastened to the pads by means of screws 64–68 and holds wires 48 and 50 in place. The retainer plate is provided with openings 70–73 to accommodate the knob shafts. Arrows 75 and 77 indicate the direction in which the wires deflect during insertion and extraction of the knobs. The ease with which the knobs can be installed and removed facilitates access to the display monitor for servicing.

Continuing now with reference to FIG. 3, a flexible shaft 78 is bonded at one end to knob 24. The shaft in the preferred embodiment is formed of several layers of wire 83, 84 wound in opposite directions on a core 85 and includes an end 81 formed into a square cross section by pressing in a die. Of course, it will be recognized that other shaft cross sections may also be utilized, provided a complementarily configured opening is formed in upper pulley 38. The flexibility of the shaft allows lateral misalignment in the X- and Y-axis directions relative to the square-broached hole 82 formed longitudinally in upper pulley 38. The upper pulley has a funnel-shaped front surface 86 which guides the flexible shaft into the broached hole when inserting the knob even in the presence of lateral misalignment. With the knob in place, the square end of the shaft mates with the square-broached hole in the upper pulley. This arrangement allows the upper pulley to be driven by the knob assembly, yet allows for substantial longitudinal misalignment in the Z-axis direction as indicated by bidirectional arrow 88. Compensation for longitudinal misalignment is achieved by making hole 82 sufficiently deep and the squared end of the shaft sufficiently long to enable the two to mate over a range of distances between the upper pulley and the housing. The upper pulley has an integral shaft 90 by means of which it is journaled in mounting block 40. The pulley is held in place by means of a retainer 92 and is also provided with a groove 94 for receiving O-ring drive belt 34. O-ring drive belt 34 engages upper pulley 38 by means of groove 94 and drives lower pulley 36 by engaging it at a groove 96. The lower pulley is mounted to shaft 29 of contrast control 42 and held in place by set-screw 98. The O-ring belt is under slight tension to minimize backlash. The slight tension also serves to limit the maximum torque that can be transmitted so that the contrast control cannot be damaged by excess torque when it is driven to its maximum range.

Figure 5:
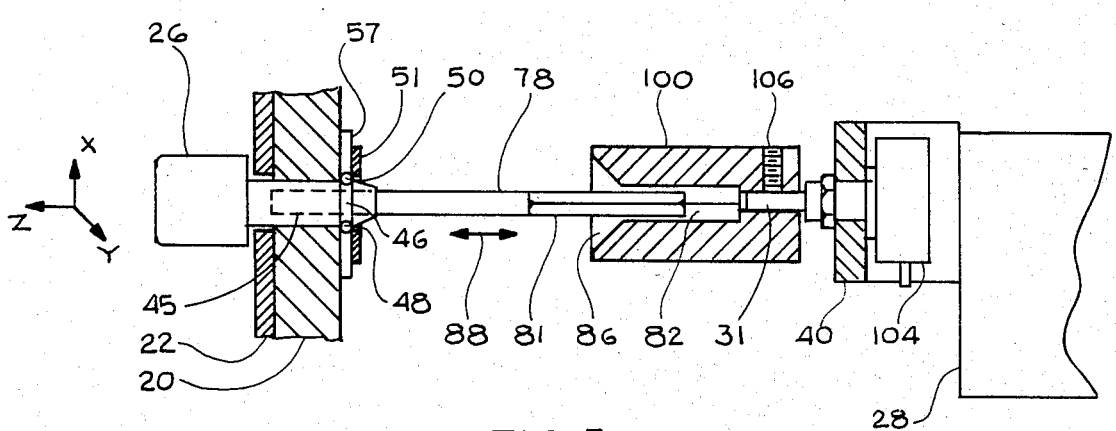
FIG. 5 is a side, cross-sectional view of another embodiment of the inventive actuating mechanism.

FIG. 5 illustrates a partial, cross-sectional view of another embodiment of the invention which is similar to that of FIG. 3 and in which like parts are assigned like reference numbers. This embodiment is useful where the device to be driven is not offset relative to the knob. One such application is the volume controls 31 and 32 shown in FIG. 2. As shown in FIG. 5, flexible shaft 78 is bonded at one end to volume control knob 26 and at its square end 81 coupled directly to square-broached hole 82 in coupling 100 which is mounted on shaft 31 of a volume potentiometer 104 by means of set-screw 106. The coupling is provided with a funnel-shaped front surface 86 which serves to compensate for misalignment in the X- and Y-axis directions. The broached hole and shaft, as before, compensate for misalignment in the Z-axis direction. Potentiometer 104 is mounted along with upper pulleys (38 and 39, FIG. 2) on mounting block 40 to the front surface of monitor chassis 28.

While this invention has been described with reference to particular embodiments and examples, other modifications and variations will occur to those skilled in the art in view of the above teachings. Accordingly, it should be understood that within the scope of the appended claims the invention may be practiced otherwise than is specifically described.

The invention claimed is:

1. A self-aligning control mechanism for adjusting a control device by means of rotational motion, said mechanism comprising:
   a flexible shaft secured at one of its ends to a means for imparting rotational motion to the shaft; and
   coupler means having an opening formed therein for releasably engaging the other end of said flexible shaft for rotational motion even when the opening and shaft are longitudinally misaligned, said coupler means being coupled to said control device for transmitting thereto the rotational motion of said flexible shaft, said coupler means having a funnel-shaped surface for receiving and guiding into the opening the other end of said shaft, even when said shaft and opening are laterally misaligned.

2. The self-aligning control mechanism of claim 1 wherein said means for imparting rotational motion comprises an adjustment knob which is journaled for rotation by means of an integral shaft in the housing of an apparatus of which the control device forms a part, said integral shaft having means for releasably engaging a pair of resilient retainer wires secured to the housing and permitting said knob and said shaft to be repeatedly removed and reinstalled with a minimum of effort.

3. The self-aligning control mechanism of claim 2 wherein said integral shaft is provided with a cone-shaped end for spreading said pair of resilient retainer wires when said knob is being installed until said wires engage said means for releasably engaging.

4. The self-aligning control mechanism of claim 1 wherein said coupler means comprises a first pulley having the opening formed therein for receiving said flexible shaft and a second pulley coupled to the control device, said first and second pulleys being coupled by a drive belt, such that the rotational motion of said flexible shaft is transmitted to said first pulley and thence by means of said drive belt to said second pulley and to the control device, said drive belt being tensioned to permit limited slippage relative to said first and second pulleys and limit the maximum torque transmitted to the control device at the extremes of the adjustment range thereof.

5. The self-aligning control mechanism of claim 4 wherein said drive belt comprises an O-ring drive belt mounted under slight tension on said first and second pulleys to limit the maximum torque that can be transmitted to the control device and to minimize backlash.

6. The self-aligning control mechanism of claim 4 wherein said means for imparting rotational motion comprises an adjustment knob which is journaled for rotation by means of an integral shaft in the housing of an apparatus of which the control device forms a part, said integral shaft having means for releasably engaging a pair of resilient retainer wires secured to the housing and permitting said knob and said shaft to be repeatedly removed and reinstalled with a minimum of effort.

7. The self-aligning mechanism of claim 1 wherein said flexible shaft comprises multiple layers of wire wound in opposite directions on a core.

8. A self-aligning control mechanism for adjusting a control device by means of rotational motion, said mechanism comprising:
   a flexible shaft secured at one of its ends to a means for imparting rotational motion to the shaft, said means including an adjustment knob which is journaled for rotation by means of an integral shaft in the housing of an apparatus of which the control device forms a part, said integral shaft having means for releasably engaging a pair of resilient retainer wires secured to the housing and permitting said knob and said shaft to be repeatedly removed and reinstalled with a minimum of effort, said integral shaft being provided with a cone-shaped end for spreading said pair of resilient retainer wires when said knob is being installed until said wires engage said means for releasably engaging; and coupler means having an opening formed therein for releasably engaging the other end of said flexible shaft for rotational motion even when the opening and shaft are longitudinally misaligned, said coupler means being coupled to said control device for transmitting thereto the rotational motion of said flexible shaft, said coupler means having a funnel-shaped surface for receiving and guiding into the opening the other end of said shaft, even when said shaft and opening are laterally misaligned.

9. The self-aligning mechanism of claim 8 wherein said coupler means comprises a first pulley having the opening formed therein for receiving said flexible shaft and a second pulley coupled to the control device, said first and second pulleys being coupled by a drive belt, such that the rotational motion of said flexible shaft is transmitted to said fist pulley and thence by means of said drive belt to said second pulley and to the control device, said drive belt being tensioned to permit limited slippage relative to said first and second pulleys and limit the maximum torque transmitted to the control device at the extremes of the adjustment range thereof.

10. The self-aligning mechanism of claim 9 wherein said drive belt comprises an O-ring drive belt mounted under slight tension on said first and second pulleys to limit the maximum torque that can be transmitted to the control device and to minimize backlash.

11. The self-aligning mechanism of claim 10 wherein said flexible shaft comprises multiple layers of wire wound in opposite directions on a core.

* * * * *